W. A. BURGER AND W. GROSS.
SPRING WHEEL.
APPLICATION FILED DEC. 27, 1917.

1,344,483.

Patented June 22, 1920.
2 SHEETS—SHEET 1.

WITNESSES
George A. Myers.

INVENTOR
WILLIAM A. BURGER
WILLIAM GROSS
BY
ATTORNEYS

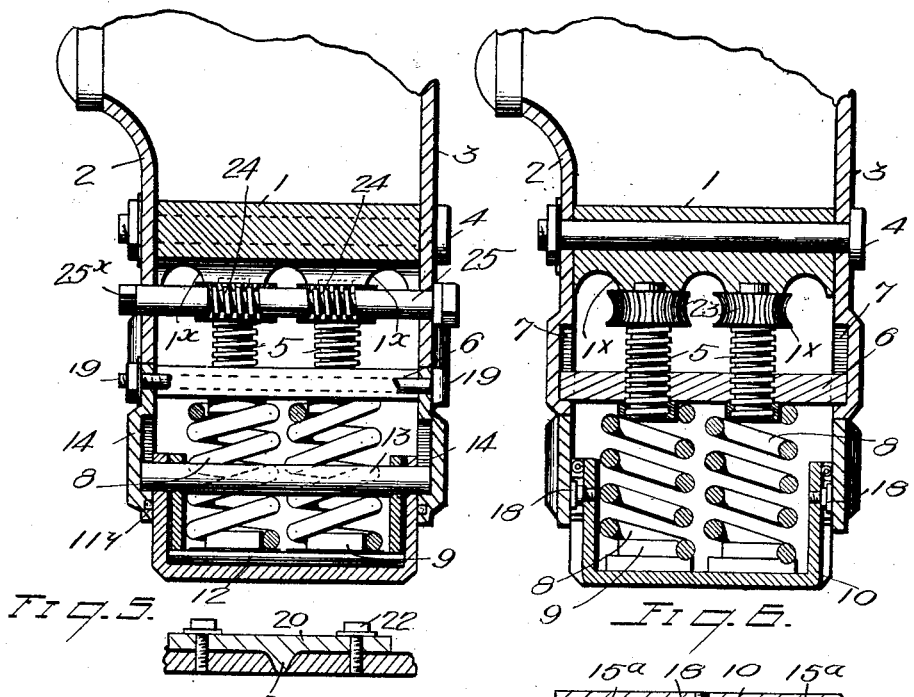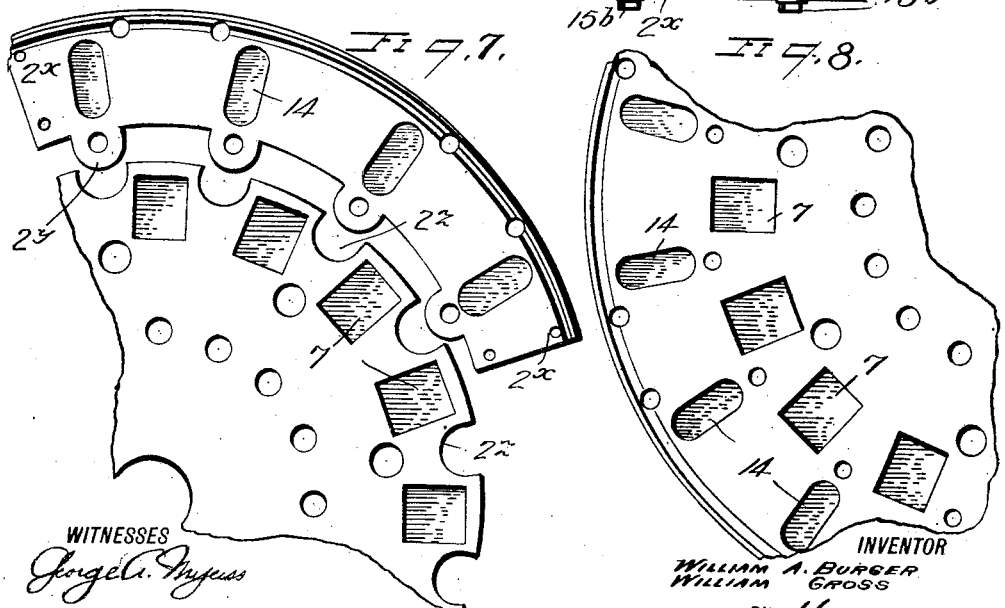

UNITED STATES PATENT OFFICE.

WILLIAM ADOLPH BURGER AND WILLIAM GROSS, OF SAN FRANCISCO, CALIFORNIA.

SPRING-WHEEL.

1,344,483.  Specification of Letters Patent.  Patented June 22, 1920.

Application filed December 27, 1917. Serial No. 209,119.

*To all whom it may concern:*

Be it known that we, WILLIAM A. BURGER and WILLIAM GROSS, citizens of the United States, and residents of San Francisco, in the county of San Francisco and State of California, have made certain new and useful Improvements in Spring-Wheels, of which the following is a specification.

Our invention relates to improvements in all metal spring wheels, and it consists in the combinations, constructions and arrangements herein described and claimed.

An object of our invention is to provide an all metal spring wheel which is designed to take the place of a pneumatic tired wheel.

A further object of our invention is to provide a spring wheel in which the rim is composed of a series of movable sections, these sections being cushioned by radially extending springs whose tension may be varied at will.

A further object of our invention is to provide a device of the type described which is made up in sections, these sections being interchangeable so that if one part is broken it can be immediately replaced.

A further object of our invention is to provide a spring wheel of the type described which is relatively cheap to manufacture.

Other objects and advantages will appear in the following specification and the novel features of the invention will be particularly pointed out in the appended claims.

Our invention is illustrated in the accompanying drawings forming part of this application, in which.

Figure 2:
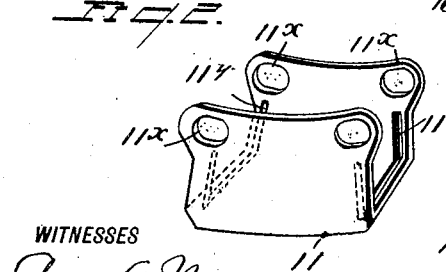
Fig. 2 is a perspective view of one of the removable sections.
Figure 2A:
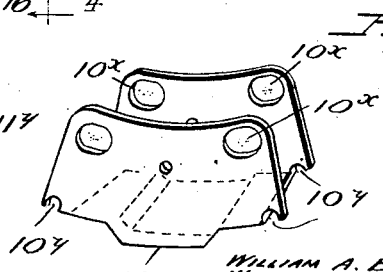

Fig. 2$^a$ is a perspective view of an adjacent movable section.

Figure 1:
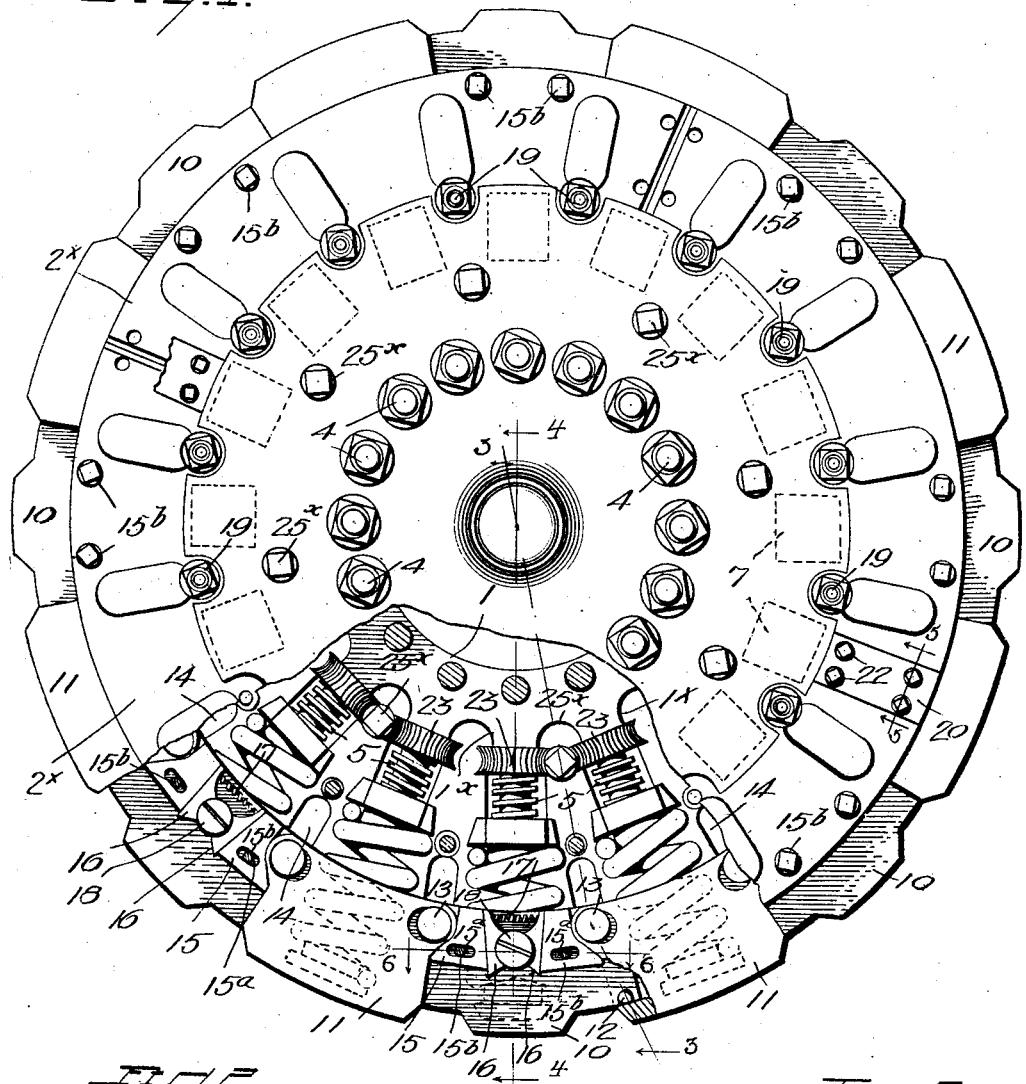
Figure 1 is a side view of a wheel constructed in accordance with our invention, certain parts being broken away.

Fig. 3 is a section on the line 3—3 of Fig. 1.

Fig. 4 is a section on the line 4—4 of Fig. 1.

Fig. 5 is an enlarged section along the line 5—5 of Fig. 1.

Fig. 6 is an enlarged section along the line 6—6 of Fig. 1.

Fig. 7 is an inside face view of a portion of one of the face plates;

Fig. 8 is an inside face view of a portion of the modified form of face plate.

In carrying out our invention we provide an inner annular ring or base plate 1 of the shape shown in the drawing. Secured to the sides of this annular base plate 1 are the outer and inner side plates 2 and 3, respectively, by bolts 4. As will be seen from the drawings, the annular base plate 1 has a series of radially extending lugs $1^x$, which form the holding members for the cylindrical ends of screw shafts 5, these screw shafts being threaded into slidable plates 6 whose ends enter recesses 7 in the outer and inner plates 2 and 3, respectively.

Arranged to bear on the slidable plates 6 are the spiral springs 8. The opposite ends of these springs bear on lugs 9 carried by slidable tread sections 10 and 11. The slidable sections 10 and 11 are best shown in Figs. 2$^a$ and 2 respectively. In these figures it will be seen that the section 10 consists of a U-shaped pressed plate having openings $10^x$ near its upper edge, and having slots $10^y$ near its corners for rollers 12—see Fig. 3. The sections 11 have a somewhat similar shape and are provided with openings $11^x$, and with asbestos bearings $11^y$ arranged to register with the rollers 12. It will be observed that these members 11 overlap the ends of the members 10, the ends of the latter entering the ends of the members 11, and the rollers 12 resting on the packings $11^y$ with the openings $10^x$ of the adjacent corners of the slidable members 10 in registration with the openings $11^x$ of the slidable members 11. Pins 13 pass through the alined openings in the adjacent members 10 and 11, the outer ends of these pins entering slots or recesses 14 in the side plates 2 and 3.

As will be seen from Fig. 1, and as already stated the ends of the U-shaped members 11 over-lap the ends of the U-shaped members 10. Disposed between the adjacent ends of adjacent U shaped members 11 are movable plates 15; these plates abut plates 16 of the shape shown in the drawings, the inner ends of each pair of plates 16 being normally spaced apart by means of a spring 17. A screw 18 forms a pivot pin for the plates 16, this screw being secured to the member 10 see Figs. 1 and 4, on each side of the member 10, the plates 15 having slots $15^a$ so that they may be permitted to slide on pins $15^b$. Bolts 19 pass through openings in the side plates 2 and 3 to aid in holding these plates together.

In the form of face plate shown in Fig. 7 it will be observed that the outer section consists of a series of arc-shaped plates $2^x$ having lugs $2^y$ arranged to enter recesses $2^z$, whereby the plates $2^x$ are maintained in position. In order to secure the arc shaped plates together, the connecting plates 20 —see Figs. 1 and 5—are provided, each of these plates having a rib 21 arranged to enter between the ends of the plates $2^x$, and to be secured thereto by means of bolts or pins 22. In the form of plate shown in Fig. 8, the outer and inner sections are integral and the connecting plates are of course omitted. This modified form of plate may be used for one or both sides of the wheel, as desired.

Disposed on the screw shafts 5 are worm gears 23, which are arranged to be engaged by the screws or worms 24, the latter being mounted on shafts 25 journaled in the side plates 2 and 3. The shafts 25 are squared at one end as shown at $25^x$, to permit of the turning of the shafts. It will be observed that these shafts are disposed so that they engage gears 23 on each side thereof. In other words, each worm shaft operates two gears.

From the foregoing description of the various parts of the device, the operation thereof may be readily understood.

The construction described provides a series of radially movable sections, these sections being normally pressed upon by the springs 8, so as to give when under pressure, and to restore the movable members 10 and 11 to their original positions, when the pressure is relieved. It will be noted that the slots $10^x$ and $11^x$ are inclined so that as the sections are pushed inwardly the pins 13 will play backwardly and forwardly in the radial slots 14 of the side plates, and at the same time have a lateral play in the slots $10^x$ and $11^x$. The small plates 15 and 16 form means for excluding dirt from the interior portions of the wheel. By manipulating the ends $25^x$ of the worm shafts more or less tension may be placed on the springs 8, so that the force of impact may be more evenly distributed.

It will also be understood that the movable sections or in fact, the springs and slidable plates may be removed quickly and replaced as in the case of a breakage or for any other purpose. The wheel thus described above has the advantages of a pneumatic tire, but at the same time affords a construction which is all metal.

We claim:

1. An all metal spring wheel comprising a pair of opposed face plates having guide recesses therein, a plurality of tread sections, alternate tread sections overlapping the ends of intermediate tread sections, retaining members for said tread sections, said retaining members passing through portions of the overlapped sections, the ends of the retaining members being disposed in certain of said guide recesses, an annular base plate secured to said face plates and springs disposed between said base plate and each of said tread members, and means for adjusting the tension of said springs.

2. An all metal spring wheel comprising a pair of opposed face plates having guide recesses therein, a plurality of tread sections, alternate tread sections overlapping the ends of intermediate tread sections, retaining members for said tread sections, said retaining members passing through portions of the overlapped sections, the ends of the retaining members being disposed in certain of said guide recesses, an annular base plate secured to said face plates and spring means disposed between said base plate and each of said tread members, a radially slidable plate for each of said spring means having its ends disposed in certain of said guide recesses in the face plates, and means operated at the outer side of one of said face plates for moving said slidable plate to exert more or less tension on said spring means.

3. An all metal spring wheel comprising a pair of opposed face plates having guide recesses therein, a plurality of tread sections, alternate tread sections overlapping the ends of intermediate tread sections, retaining members for said tread sections, said retaining members passing through portions of the overlapped sections, the ends of the retaining members being disposed in certain of said guide recesses, an annular base plate secured to said face plates and springs disposed between said base plate and each of said tread members, a radially slidable plate having its ends disposed in certain of said guide recesses in the face plates, means operated at the outer side of one of said face plates for moving said slidable plate to exert more or less tension on said springs, said last named means comprising a worm shaft, a screw shaft threaded into said slidable plate, and means for operating the screw shaft from the worm shaft.

4. In an all metal wheel, an annular base ring, a pair of opposed face plates secured to said base ring, a plurality of U-shaped tread sections, alternate tread sections overlapping the ends of the intermediate tread sections, said alternate sections being provided with bearings and said intermediate sections being provided at their ends with slots arranged to register with the bearings of the alternate sections, rollers disposed in the slots against the bearings, and means for pivotally connecting said sections together.

5. In an all metal wheel, an annular base ring, a pair of opposed face plates secured to said base ring, a plurality of U-shaped tread sections, alternate tread sections overlapping the ends of the intermediate tread sections, said alternate sections being provided with bearings and said intermediate sections being provided at their ends with slots arranged to register with the bearings of the alternate sections, rollers disposed in the slots against the bearings, means for pivotally connecting said sections together, radially extending spiral springs disposed between each tread section and said annular base ring, and means for varying the tension of said springs.

WILLIAM ADOLPH BURGER.
WILLIAM GROSS.

Witnesses:
 JULIAN D. BREMER,
 CLIFFORD K. JAMISON.